United States Patent Office 2,912,395
Patented Nov. 10, 1959

2,912,395

FAST-CURING LINOLEUM COMPOSITION CONTAINING POLYMETHYLOL PHENOLS

Galen E. Graham, East Hempfield Township, Lancaster County, Pa., assignor to Armstrong Cork Company, Lancaster, Pa., a corporation of Pennsylvania No Drawing. Application June 25, 1956
Serial No. 593,336

14 Claims. (Cl. 260—19)

This invention relates generally to linoleum compositions, and more particularly to linoleum cements. Still more particularly, it relates to linoleum cements containing an additive which serves to increase the rate of cure of the linoleum composition, or to improve the color of the cured linoleum composition, or both. The invention includes both linoleum compositions and the method of making those compositions.

Linoleum cements have been made for a number of years from a drying oil and a resin by a number of methods which result in the production of a siccative oil-resin gel by oxidizing and polymerizing the drying oil generally in the presence of the resinous material. Ordinarily linoleum cements comprise about 65% to 85% drying oil such as linseed oil and about 15% to 35% resin such as rosin. Any drying or semidrying oil commonly employed in the manufacture of such cements may be used. The resulting mixture may be oxidized in conventional cement-making equipment to produce a highly desirable binder which can be compounded with other ingredients to produce linoleum compositions in the conventional manner.

In recent years, tall oil and esters of tall oil made, for example, from tall oil and pentaerythritol have been used as a total or partial replacement for the normally used drying oils such as linseed oil. In many of these cements, the rosin present in the crude tall oil serves as the resin in the cement.

These cements are compounded with fillers and pigments and any other desirable additives and calendered or otherwise adhered to a backing such as burlap, muslin, or a felt. The resulting product is then cured in air at elevated temperature until the desired physical properties of the linoleum composition are reached.

The period of cure may run several weeks and thus involve a considerable tie-up of stoves and auxiliary equipment. Additionally, the prolonged period of cure often produces—as a result of the chemical reactions taking place in the linoleum composition, a discoloration or staining of the composition; this is particularly true where light or pastel shades are used. Therefore, anything that can be done to shorten the period of cure and to minimize the staining resulting from the curing reactions would be highly advantageous to the linoleum industry. Unfortunately, curing accelerators from other arts such as the rubber art cannot be extrapolated into the linoleum art. For example, sulfur-containing curing systems blacken linoleum, and peroxide-containing systems do not accelerate linoleum cure at all.

Accordingly, it is an object of the present invention to supply a linoleum composition which will cure in a shorter period of time than those compositions normally used. It is a further object to supply a composition which will undergo less stove staining than the normal compositions.

To these ends, the invention contemplates a linoleum composition comprising a linoleum cement containing oxidized siccative oil and resin and about 1% to about 15% by weight of said cement of an additive. The additive is an aliphatic hydrocarbon-substituted polyalkylol phenol selected from the group consisting of polymethylol and polyethylol phenols.

The compounds to be added to a linoleum cement containing oxidized siccative oil and resin may be generally defined as monomeric aliphatic hydrocarbon-substituted polyalkylol phenols. More particularly, the compounds are polymethylol or polyethylol phenols wherein an aromatic ring is substituted with an aliphatic hydrocarbon group.

The compounds may be defined as those having the formula

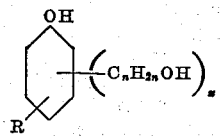

wherein $n$ is an integer from 1 to 2 inclusive, $x$ is an integer from 2 to 4 inclusive, and R is selected from the group consisting of $C_yH_{2y}+1-$ and

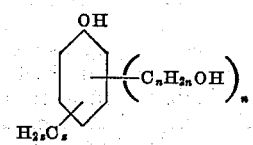

wherein $y$ is an integer from 1 to 30 inclusive, preferably 1 to 8 inclusive, $z$ is an integer from 1 to 5 inclusive, and $n$ and $x$ have the meanings assigned above. Preferably R and $C_zH_{2z}-$ will be in the position para to the phenolic OH group.

The phenolic compounds useful in the present invention can be made in any manner well-known to those skilled in the art. They may be made by reacting a para-aliphatic hydrocarbon-substituted phenol having the two ortho positions unoccupied with a considerable molar excess of formaldehyde or acetaldehyde. The mole ratio of the aldehyde to the phenol will usually be slightly in excess of 2:1. The reaction is carried out in the presence of a strong alkaline catalyst, especially an alkali metal hydroxide, which is subsequently neutralized. The mixture of the phenol, aldehyde, and alkaline catalyst is heated at a suitably low temperature, for example 25°–40° C. Such reaction will produce polyalkylol phenols as monomers, for example, the para substituted-2,6-dialkylol phenol. Temperatures higher than about 40° C. will produce some polymer which reduces the activity of the compound. The polyalkylol phenol can be isolated by acidification of the mixture and separation of the solids or the oily layer. Alternatively, water may be stripped from the mixture by warming under vacuum.

The phenol used to make the monomeric compounds useful in the present invention may have any aliphatic hydrocarbon group in the position para to the phenolic hydroxyl group. Should an aromatic group such as phenyl or naphthyl occupy the para position, the resulting compound is unsuitable in the present invention. The aliphatic hydrocarbon group should be an alkyl group containing 1 to 30 carbon atoms. Preferred examples of the alkyl group are methyl, tertiary butyl, and octyl. Nonhydrocarbon groups such as chloro render the final compound inoperable.

The starting phenol may also be a bis-phenol. Examples of such compounds are bis-(4-hydroxy-phenyl)-methane; bis-(2-hydroxy-phenyl) - methane; bis - (4 - hydroxy-2-methyl-phenyl) - methane; beta,beta - bis(4 - hydroxy phenyl)-propane (bis-phenol A); beta,beta-bis (2,4'-dihydroxy-diphenyl)-propane; beta,beta - bis(2 - hydroxy-phenyl) - propane; beta,beta - bis(4 - hydroxy - 2-methyl-phenyl)-butane; and beta,beta-bis-(2,4'-dihydroxyphenyl)-pentane. Where these bis-phenols are used as the starting phenol, it is preferred that sufficient aldehyde be added to the reaction mixture to form the tetraalkylol compound. Thus, the mole ratio of aldehyde to bis-phenol will be slightly in excess of 4:1. Conditions of reaction otherwise will remain substantially the same.

It must be emphasized that the compounds useful in the present invention are monomers. Thus, the reaction of the aldehyde and the phenol must be stopped before condensation takes place with the attendant polymer formation. Such resins, while useful in some respects when incorporated in a linoleum composition, also tend to impart characteristics considered undesirable. For example, the addition of such resins may reduce the flexibility of the final product. An outstanding disadvantage of the use of resins is the difficulty of adequately dispersing the resin in the linoleum cement. Intimate and thorough dispersion is essential, yet no satisfactory means of accomplishing this has yet been found. The present compounds, however, can be quickly and thoroughly dispersed in a linoleum cement on a mill or other equipment standard for handling linoleum cement. Additionally, several of the present compounds shorten the cure time as much as 25% more than does the same amount of resin.

As mentioned above, the amount of the polyalkylol phenols to be incorporated in the linoleum composition will be in the range of about 1% to about 15% by weight of the linoleum cement gel. Amounts less than about 1% do not give any practical beneficial results, although stove staining may be improved where amounts slightly under 1% by weight are added. Amounts greater than about 15% by weight, aside from being unnecessary and thus constituting a waste of the compound, may cause undesirable property changes in the final cured linoleum composition; for example, the cured composition may possess insufficient flexibility. It has been found that in the lower range of amounts, that is about 1% to about 3% or 4% by weight, many of the compounds do not give an increased rate of cure to the composition. At these lower levels, however, a definite advantage in the reduction of stove staining will be achieved. At higher levels from about 4% on up to the maximum of about 15% by weight, the increased rate of cure becomes definite and often dramatic and the advantage of color improvement is maintained. The preferred amount is in the range of about 4%–8% by weight. It is a general rule in linoleum manufacture that the longer the period of cure required, the greater the degree of stove staining. Thus, any system which shortens the cure period must also diminish the stove staining. In the case of the present invention, however, the polyalkylol phenols appear to diminish stove staining by a function other than that of reducing the period of cure. This appears true in view of the observation that small amounts of the compounds—too small to reduce the period of cure, nevertheless reduce stove staining. All of the above amounts are based on the initial weight of a linoleum cement gel before replacement with the additive.

The mechanism by which the polyalkylol phenols useful in the present invention operate is not known. It is not to be anticipated that they would play the role of curing accelerators and staining diminishers. This is true for several reasons. First of all, the parent phenols from which the compounds useful in the present invention are made actually inhibit the cure of linoleum. Additionally, the monoalkylol phenols carrying a single methylol or ethylol group inhibit the formation of a tough compound resulting from the oxidation of drying oils. In U.S. Patent No. 2,715,072, issued August 9, 1955, to Chenicek et al., this inhibitory effect of monoalkylol (monoalkoxy) phenols on drying oil compositions is set forth in some detail. With this background, it is unobvious and unexpected to find that the polyalkylol (polyalkoxy) phenols should have just the reverse effect.

The following examples illustrate several embodiments of the invention. All parts are by weight unless otherwise stated.

*Example I*

Into a stainless steel container containing 800 parts of 10% aqueous sodium hydroxide solution (2 moles NaOH) was introduced 228 parts (1 mole) beta,beta-bis-(4-hydroxy phenyl)-propane. The temperature rose to 30°–35° C. After cooling to room temperature (about 28° C.), there was added 330 parts (4.4 moles) 40% solution of formaldehyde. The mixture was allowed to stand at room temperature for 24 hours.

At the end of that period, the mixture was acidified with a 30% solution of acetic acid to a pH of 6. The bottom, oily layer was separated and washed twice with water. This tetramethylol derivative of beta,beta-bis-(4-hydroxy phenyl)-propane was used without drying it in several of the examples below where indicated.

*Example II*

The following materials were treated as in Example I.

| | Parts |
|---|---|
| p-(2-ethyl-hexyl) phenol | 206 (1 mole). |
| NaOH solution, 10% | 400 (1 mole NaOH). |
| Formaldehyde, 40% | 165 (2.2 moles HCHO). |

The dimethylol derivative of p-(2-ethyl-hexy) phenol which resulted was used in the form of a wet, oily liquid where indicated in the following examples.

*Example III*

The following materials were treated as in Example I.

| | Parts |
|---|---|
| p-cresol | 108 (1 mole). |
| NaOH solution, 10% | 400 (1 mole NaOH). |
| Formaldehyde, 40% | 165 (2.2 moles HCHO). |

A precipitate developed on acidification to a pH of 6. The precipitate was filtered out, washed with water, air-dried, and used where indicated in the following examples.

Other compounds used in the following examples were prepared in similar manner.

*Example IV*

The following compositions were mill-mixed and then sheeted on a mill to 0.125" gauge. Samples were then cured in a forced air oven at 195° F. to a standard end point of 35% indentation produced by 0.178" diameter tip under a 150 pound load for 30 seconds.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Tetramethylol derivative of beta,beta-bis-(4-hydroxy phenyl)-propane. | 11 | |

Linoleum cement A is an oxidized mixture containing 56% of the partial esters of crude tall oil and pentaerythritol and 44% linseed oil.

Cure time for control mix equals 20 days.
Cure time for experimental mix equals 9 days.

Example V

The following compositions were treated as in Example IV.

| Ingredients | Parts | Parts (Control) |
|---|---|---|
| Linoleum Cement B | 211 | 222 |
| Wood flour | 144 | 144 |
| Whiting (calcium carbonate) | 234 | 234 |
| Tetramethylol derivative of beta,beta-bis-(4-hydroxy phenyl)-propane | 11 | |

Linoleum cement B is an oxidized mixture containing 52% partial esters of crude tall oil and pentaerythritol and 48% linseed oil.

Cure time for control mix equals 27 days.
Cure time for experimental mix equals 10 days.

Example VI

The following compositions were treated as in Example IV.

| Ingredients | Parts | Parts (Control) |
|---|---|---|
| Linoleum Cement C | 211 | 222 |
| Wood flour | 144 | 144 |
| Whiting (calcium carbonate) | 234 | 234 |
| Tetramethylol derivative of beta,beta-bis-(4-hydroxy phenyl)-propane | 11 | |

Linoleum cement C is an oxidized mixture containing 68.54% linseed oil, 20.86% wood rosin, 9.93% crude tall oil, and 0.66% lime.

Cure time for control mix equals 20 days.
Cure time for experimental mix equals 7 days.

Example VII

The following compositions were treated as in Example IV.

| Ingredients | Parts | Parts (Control) |
|---|---|---|
| Linoleum Cement D | 211 | 222 |
| Wood flour | 144 | 144 |
| Whiting (calcium carbonate) | 234 | 234 |
| Tetramethylol derivative of beta,beta-bis-(4-hydroxy phenyl)-propane | 11 | |

Linoleum cement D is an oxidized mixture containing 69% linseed oil, 21% wood rosin, and 10% crude tall oil.

Cure time for control mix equals 27 days.
Cure time for experimental mix equals 9 days.

Example VIII

The following compositions were treated as in Example IV.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Dimethylol derivative of p-cresol | 11 | |

Cure time for control mix equals 23 days.
Cure time for experimental mix equals 8 days.

Example IX

The following compositions were treated as in Example IV.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Dimethylol derivative of paratertiary butyl phenol | 11 | |

Cure time for control mix equals 26 days.
Cure time for experimental mix equals 17 days.

Example X

The following compositions were treated as in Example IV.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Dimethylol derivative of para-(2-ethyl-hexyl) phenol | 11 | |

Cure time for control mix equals 26 days.
Cure time for experimental mix equals 22 days.

Example XI

The following compositions were treated as in Example IV.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Dimethylol derivative of paraphenyl phenol | 11 | |

Cure time for control mix equals 26 days.
Cure time for experimental mix equals 26 days, thus showing that aromatic substituents neutralize beneficial effect of the additives.

Example XII

A series of cements was prepared as in Example IV using the tetramethylol derivative of beta,beta-bis-(4-hydroxy phenyl)-propane. The compositions were sheeted out to 0.050" gauge and were cured in an oven at 190° F. to the standard end point.

The following table shows the percent replacement of the cement with the tetramethylol compound and the number of days necessary to achieve cure for each composition.

| Percent replacement: | Days |
|---|---|
| 0 | 9 |
| 2 | 7 |
| 5 | 4 |
| 10 | 2 |
| 15 | 1 |

At the 15% replacement level, the compositions were beginning to be too short; the bend-break angle was reduced.

Example XIII

Example VII was repeated twice, once with 11 parts and once with 22 parts of beta,beta-bis-(4-hydroxy phenyl) propane itself substituted for the cement.

Cure time in both cases was 29 days, thus showing the inhibitory effect of the parent bis-phenol compound.

I claim:

1. A linoleum composition comprising filler and a linoleum cement containing 65%–85% by weight oxidized siccative fat oil and 35%–15% by weight rosin and about 1% to about 15% by weight of said oil and said rosin of a monomeric aliphatic hydrocarbon-substituted polyalkylol phenol having the formula

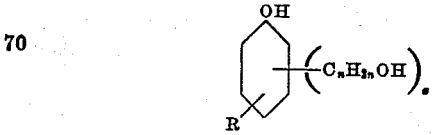

wherein $n$ is an integer from 1 to 2 inclusive, $x$ is an integer from 2 to 4 inclusive, and R is selected from the group consisting of $C_yH_{2y+1}-$ and

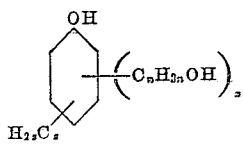

wherein $y$ is an integer from 1 to 30 inclusive, $z$ is an integer from 1 to 5 inclusive, and $n$ and $x$ have the meanings assigned above.

2. A linoleum composition comprising filler and a linoleum cement containing 65%–85% by weight oxidized siccative fat oil and 35%–15% by weight rosin and about 1% to about 15% by weight of said oil and rosin of a monomeric aliphatic hydrocarbon-substituted polymethylol bis-phenol.

3. A linoleum composition comprising filler and a linoleum cement containing 65%–85% by weight oxidized siccative fat oil and 35%–15% by weight rosin and about 1% to about 15% by weight of said oil and rosin of a monomeric aliphatic hydrocarbon-substituted polymethylol mononuclear phenol.

4. A composition according to claim 1 wherein said amount of said polymethylol phenol is in the range of about 4% to 8%.

5. A composition according to claim 1 wherein said polymethylol phenol comprises the reaction product of about 2 moles of formaldehyde per mole of mononuclear phenol.

6. A composition according to claim 1 wherein said polymethylol phenol comprises a reaction product of about 4 moles of formaldehyde per mole of bis-phenol.

7. A composition according to claim 3 wherein said polymethylol phenol comprises paratertiary butyl 2,6-dimethylol phenol.

8. A composition according to claim 2 wherein said bis-phenol comprises beta,beta-(2,4'-dihydroxy-diphenyl)-propane.

9. The method of forming an improved linoleum composition which comprises admixing with filler and a linoleum cement containing 65%–85% by weight oxidized siccative fat oil and 35%–15% by weight rosin an amount of about 1% to about 15% by weight of said cement of a monomeric aliphatic hydrocarbon-substituted polymethylol phenol.

10. The method according to claim 9 wherein said polymethylol phenol comprises a tetra-alkylol bis-phenol.

11. The method according to claim 9 wherein said polymethylol phenol comprises a dimethylol mononuclear phenol.

12. The method according to claim 9 wherein said amount is in the range of about 4% to 8%.

13. The method according to claim 9 wherein said polymethylol phenol comprises the reaction product of about 2 moles of formaldehyde per mole of mononuclear phenol.

14. The method according to claim 9 wherein said polymethylol phenol comprises the reaction product of about 4 moles of formaldehyde per mole bis-phenol.

References Cited in the file of this patent

UNITED STATES PATENTS

| | | |
|---|---|---|
| 2,142,076 | Rust | Dec. 27, 1938 |
| 2,169,361 | Kohn | Aug. 15, 1939 |
| 2,224,237 | Spitzli | Dec. 10, 1940 |
| 2,345,357 | Powers | May 8, 1944 |
| 2,389,078 | Powers | Nov. 13, 1945 |
| 2,744,882 | Bender et al. | May 8, 1956 |

FOREIGN PATENTS

| | | |
|---|---|---|
| 349,931 | Great Britain | May 26, 1931 |
| 672,820 | Great Britain | May 28, 1952 |

OTHER REFERENCES

Martin: The Chemistry of Phenolic Resins, page 97, John Wiley (1956).

Carswell: Phenoplasts, pages 9–12, Interscience (1947).

UNITED STATES PATENT OFFICE
CERTIFICATE OF CORRECTION

Patent No. 2,912,395              November 10, 1959

Galen E. Graham

It is hereby certified that error appears in the printed specification of the above numbered patent requiring correction and that the said Letters Patent should read as corrected below.

Column 4, line 39, for "hexy" read -- hexyl --; column 7, line 2, for "$C_yH_2$" read -- $C_yH_{2y}$ --; lines 25, 28, and 32, for "polymethylol", each occurrence, read -- polyalkylol --.

Signed and sealed this 13th day of September 1960.

(SEAL)
Attest:

KARL H. AXLINE
Attesting Officer

ROBERT C. WATSON
Commissioner of Patents